United States Patent
Luo et al.

(10) Patent No.: US 12,418,460 B2
(45) Date of Patent: Sep. 16, 2025

(54) POLYMORPHIC NETWORK SYSTEM AND POLYMORPHIC NETWORK OPERATION METHOD

(71) Applicant: ZHEJIANG LAB, Hangzhou (CN)

(72) Inventors: Hanguang Luo, Hangzhou (CN); Huifeng Zhang, Hangzhou (CN); Geyang Xiao, Hangzhou (CN); Qi Xu, Hangzhou (CN); Wanxin Gao, Hangzhou (CN); Jun Zhu, Hangzhou (CN); Tao Zou, Hangzhou (CN); Ruyun Zhang, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 50 days.

(21) Appl. No.: 18/528,054

(22) Filed: Dec. 4, 2023

(65) Prior Publication Data
US 2025/0016070 A1 Jan. 9, 2025

Related U.S. Application Data

(63) Continuation of application No. PCT/CN2023/114641, filed on Aug. 24, 2023.

(30) Foreign Application Priority Data

Jul. 5, 2023 (CN) .......................... 202310814543.6

(51) Int. Cl.
*H04L 41/5019* (2022.01)
*H04L 41/5006* (2022.01)

(52) U.S. Cl.
CPC ...... *H04L 41/5019* (2013.01); *H04L 41/5006* (2013.01)

(58) Field of Classification Search
CPC ....... H04L 45/127; H04L 67/12; H04L 69/26; H04L 12/282; H04L 2012/285;
(Continued)

(56) References Cited

U.S. PATENT DOCUMENTS

| 6,728,750 | B1 | 4/2004 | Anderson et al. |
| 11,329,966 | B2 * | 5/2022 | Abraham ............ H04L 12/4633 |
| 2016/0315848 | A1 * | 10/2016 | Weinstein ............... H04L 45/16 |

FOREIGN PATENT DOCUMENTS

| CN | 113852567 A | 12/2021 |
| CN | 115632957 A | 1/2023 |

(Continued)

OTHER PUBLICATIONS

Y. Hu, D. Li, P. Sun, P. Yi and J. Wu, "Polymorphic Smart Network: An Open, Flexible and Universal Architecture for Future Heterogeneous Networks," in IEEE Transactions on Network Science and Engineering, vol. 7, No. 4, pp. 2515-2525, Oct. 1-Dec. 2020, doi: 10.1109/TNSE.2020.3006249. (Year: 2020).*

(Continued)

*Primary Examiner* — Djenane M Bayard (57) ABSTRACT

A polymorphic network system and a polymorphic network operation method are provided. From top to bottom, the polymorphic network system sequentially includes: an application layer configured to provide network applications corresponding to network service requirements; a service layer configured to determine network capability requirements for implementing the network applications; a mode layer configured to provide corresponding network modes based on the network capability requirements; and an environment layer configured to provide network infrastructure that is capable of supporting operation of the network modes. The network infrastructure is configured to load and transmit messages corresponding to the network applications. The messages are capable of being generated, encapsulated, decapsulated, and routed and forwarded based on the network modes corresponding to the network applications.

10 Claims, 3 Drawing Sheets

(58) Field of Classification Search
CPC ... H04L 5/0007; H04L 5/0053; H04L 5/0048; H04L 12/2803; H04L 12/2807; H04L 12/2818; H04L 12/2825; H04L 12/2827; H04L 12/2832; H04L 63/105; H04L 1/188; H04L 5/0028; H04L 5/0091; H04L 5/1469; H04L 65/1023; H04L 67/34; H04L 12/2814; H04L 12/2823; H04L 63/166; H04L 69/16; H04L 41/5051; H04L 47/10; H04L 5/00; H04L 63/0428; H04L 63/20; H04L 69/32; H04L 12/40; H04L 63/0272; H04L 67/02; H04L 67/06; H04L 69/08; H04L 69/18; H04L 1/0041; H04L 1/0057; H04L 1/08; H04L 1/1614; H04L 1/1671; H04L 1/1685; H04L 1/1819; H04L 1/1822; H04L 1/1825; H04L 1/1845; H04L 1/1854; H04L 2001/0097; H04L 41/0233; H04L 41/0816; H04L 41/0823; H04L 63/1416; H04L 41/12; H04L 45/04; H04L 45/7453; H04L 41/5006; H04L 41/5019; H04L 5/0082; G06F 21/602; G06F 21/606; G06F 17/18; G06F 18/24155; G06F 2209/5018; G06F 9/5077

See application file for complete search history.

(56) References Cited

FOREIGN PATENT DOCUMENTS

| CN | 116074208 A | 5/2023 |
| CN | 116319390 A | 6/2023 |

OTHER PUBLICATIONS

International Search Report of PCT/CN2023/114641.

\* cited by examiner

POLYMORPHIC NETWORK SYSTEM AND POLYMORPHIC NETWORK OPERATION METHOD

CROSS-REFERENCE TO RELATED APPLICATIONS

This application is a continuation of international patent application No. PCT/CN2023/114641, filed on Aug. 24, 2023, which claims priority to Chinese patent applications No. 202310814543.6, filed on Jul. 5, 2023, titled "POLYMORPHIC NETWORK SYSTEM AND POLYMORPHIC NETWORK OPERATION METHOD". The contents of the above applications are hereby incorporated by reference.

TECHNICAL FIELD

The present disclosure generally relates to a field of network communication, and in particular, to a polymorphic network system and a polymorphic network operation method.

BACKGROUND

With continuous development of network technologies and applications, the Internet has become major information infrastructure highly related to national economy and social development, which has a profound impact on improving social productivity, promoting economic and social upgrading and transformation, and creating new employment opportunities. The future Internet will not only support consumer services such as Augmented Reality (AR)/Virtual Reality (VR), online games, and webcasts, but also support manufacturing services such as industrial manufacturing, unmanned driving, and telemedicine, so as to realize ubiquitous interconnection and instruction delivery of massive terminals and provide a variety of network services based on large-scale data collection, processing, distribution, and utilization. However, in the related art, in the face of diversified and professional requirements of the above services, such as human-computer-thing intelligent networking, full space-time random access, service performance assurance, big data of the network, or distributed network computing, network technologies and development patterns have a problem that network technology modes are single and cannot meet different network service requirements.

For the issue of single network technology modes which cannot meet different network service requirements in the related art, no effective solution has yet been proposed.

SUMMARY

A polymorphic network system and a polymorphic network operation method are provided in the present embodiment.

In a first aspect, a polymorphic network system is provided in the present embodiment. From top to bottom, the polymorphic network system sequentially includes: an application layer, a service layer, a mode layer, and an environment layer.

The application layer is configured to provide network applications corresponding to network service requirements. The service layer is configured to determine network capability requirements for implementing the network applications. The mode layer is configured to provide corresponding network modes based on the network capability requirements. The environment layer is configured to provide network infrastructure that is capable of supporting operation of the network modes. The network infrastructure is configured to load and transmit messages corresponding to the network applications. The messages are capable of being generated, encapsulated, decapsulated, and routed and forwarded based on the network modes corresponding to the network applications.

In some embodiments, the environment layer includes a control layer and a data layer separated from each other, and the data layer includes a plurality of types of network nodes. The data layer is configured to perform message transmission based on the network nodes; and the control layer is configured to perform unified scheduling and centralized control over network resources of the data layer.

In some embodiments, the network nodes include terminal nodes, aggregation nodes, and backbone nodes, each of the backbone nodes is corresponding to a polymorphic network domain and a plurality of aggregation nodes in the polymorphic network domain, and each of the aggregation nodes is corresponding to a plurality of terminal nodes. The terminal nodes are configured to generate corresponding messages based on the network applications and perform message transmission with the corresponding aggregation nodes. The aggregation nodes are configured to route and forward received messages, and transmit cross-network domain messages in the messages with corresponding backbone nodes. The backbone nodes are configured to perform isolated forwarding on the cross-network domain messages.

In some embodiments, the terminal nodes are further configured to determine corresponding network modes based on the network capability requirements corresponding to the network applications, and encapsulate, based on the network modes, data of the network applications into network domain messages, send the network domain messages to the aggregation nodes, and receive and decapsulate the network domain messages sent by the aggregation nodes.

In some embodiments, the aggregation nodes are further configured to determine the corresponding network modes based on received network domain messages, and perform routing and forwarding based on addressing and routing manners of the network modes.

In some embodiments, the polymorphic network domain includes non-edge aggregation nodes and edge aggregation nodes connected to the corresponding backbone nodes. The non-edge aggregation nodes are further configured to determine whether destination routes of the network domain messages are within the polymorphic network domain where the aggregation nodes are located, and forward the network domain messages to the edge aggregation nodes when the destination routes are not within the polymorphic network domain. The edge aggregation nodes are further configured to encapsulate the network domain messages into the cross-network domain messages, and send the cross-network domain messages to the backbone nodes. The cross-network domain messages include network domain addresses where the destination routes are located.

In some embodiments, the backbone nodes are further configured to identify the corresponding network modes based on the received cross-network domain messages, acquire network domain addresses of the cross-network domain messages based on the network modes, and assign, based on network capability requirements and the network modes corresponding to the cross-network domain messages, corresponding resources to the cross-network domain messages and perform isolated forwarding.

In some embodiments, the backbone nodes are further configured to determine forwarding paths and hard isolation pipeline parameters based on the network capability requirements corresponding to the cross-network domain messages, construct, based on the forwarding paths and the hard isolation pipeline parameters, hard isolation pipelines corresponding to the network modes, and perform isolated forwarding on the cross-network domain messages based on the hard isolation pipelines.

In some embodiments, the control layer includes a controller, the controller is configured to implement at least one function of data layer function configuration and dynamic deployment, multi-modal addressing and routing, or unified network control and load balancing.

In a second aspect, a polymorphic network operation method is provided. The method is applied to a polymorphic network system, the polymorphic network system includes network infrastructure configured to load and transmit messages corresponding to network applications, and the method includes:

- determining corresponding network applications based on network service requirements;
- determining corresponding network capability requirements based on the network applications;
- determining corresponding network modes based on the network capability requirements; and
- generating, encapsulating, decapsulating, and routing and forwarding, based on the network modes, messages corresponding to the network applications in the network infrastructure.

Details of one or more embodiments of the present disclosure are set forth in the following accompanying drawings and descriptions. Other features, objectives, and advantages of the present disclosure become obvious with reference to the specification, the accompanying drawings, and the claims.

BRIEF DESCRIPTION OF THE DRAWINGS

In order to more clearly illustrate the technical solutions in embodiments of the present disclosure or the conventional art, the accompanying drawings used in the description of the embodiments or the conventional art will be briefly introduced below. It is apparent that, the accompanying drawings in the following description are only some embodiments of the present disclosure, and other drawings can be obtained by those of ordinary skill in the art from the provided drawings without creative efforts.

DETAILED DESCRIPTION OF THE EMBODIMENT

The technical solutions in embodiments of the present disclosure will be described clearly and completely below with reference to the accompanying drawings in the embodiments of the present disclosure. Apparently, the described embodiments are merely some of rather than all of the embodiments of the present disclosure. All other embodiments acquired by those of ordinary skill in the art without creative efforts based on the embodiments of the present disclosure shall fall within the protection scope of the present disclosure.

Unless defined otherwise, technical terms or scientific terms involved in the present disclosure have the same meanings as would generally understood by those skilled in the technical field of the present disclosure. In the present disclosure, "a", "an", "one", "the", "these", and other similar words do not indicate a quantitative limitation, which may be singular or plural. The terms such as "comprise", "include", "have" and any variants thereof involved in the present disclosure are intended to cover a non-exclusive inclusion, for example, processes, methods, systems, products, or devices including a series of steps or modules (units) are not limited to these steps or modules (units) listed, and may include other steps or modules (units) not listed, or may include other steps or modules (units) inherent to these processes, methods, systems, products, or devices. Words such as "join", "connect", "couple", and the like involved in the present disclosure are not limited to physical or mechanical connections, and may include electrical connections, whether direct or indirect. "A plurality of" involved in the present disclosure means two or more. The term "and/or" describes an association relationship between associated objects and represents that three relationships may exist. For example, A and/or B may represent the following three cases: only A exists, both A and B exist, and only B exists. Generally, the character "/" indicates an "or" relationship between the associated objects. The terms "first", "second", "third", and the like involved in the present disclosure are only intended to distinguish similar objects and do not represent specific ordering of the objects.

Figure 1:
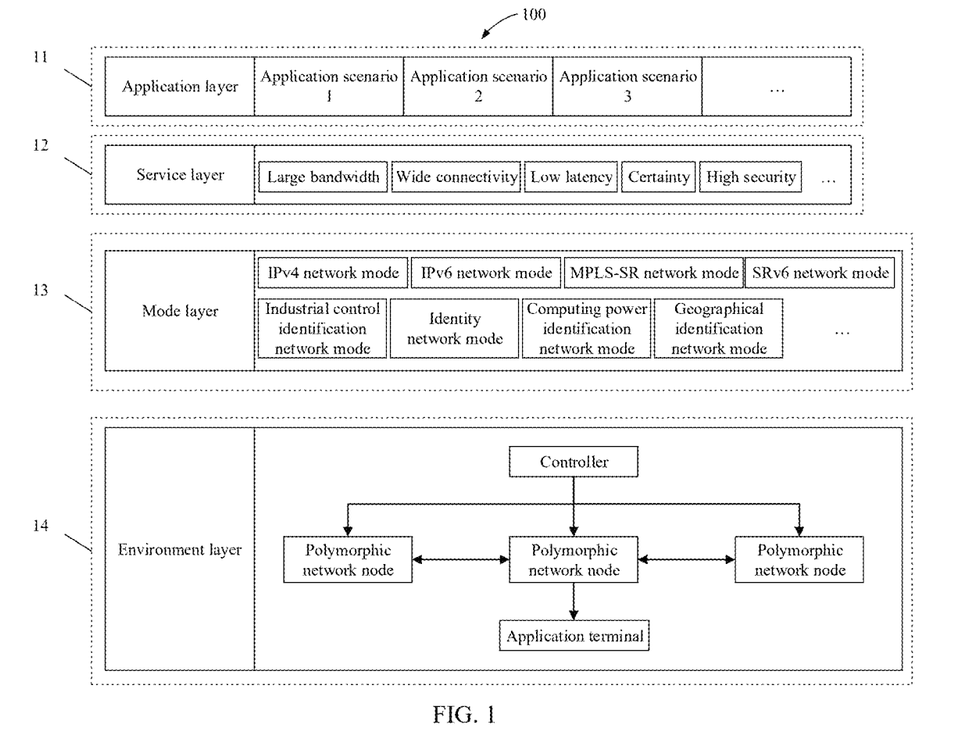
FIG. 1 is a schematic architectural diagram of a polymorphic network system in some embodiments of the present disclosure.

Referring to FIG. 1 which is a schematic diagram of a polymorphic network system 100 in some embodiments of the present disclosure. From top to bottom, the polymorphic network system 100 sequentially includes an application layer 11, a service layer 12, a mode layer 13, and an environment layer 14. The application layer 11 is configured to provide network applications corresponding to network service requirements. The service layer 12 is configured to determine network capability requirements for implementing the network applications. The mode layer 13 is configured to provide corresponding network modes based on the network capability requirements. The environment layer 14 is configured to provide network infrastructure that is capable of supporting operation of the network modes. The network infrastructure is configured to load and transmit messages corresponding to the network applications. The messages are capable of being generated, encapsulated, decapsulated, and routed and forwarded based on the network modes corresponding to the network applications.

The polymorphic network system 100 in the present embodiment may be a hierarchical network architecture. Referring to FIG. 1, in a top-down direction, the application layer 11 may refer to applications and scenarios that mainly refer to various network applications as well as environments and scenarios in which the user is most likely to be when the network applications are used, including aspects such as time, space, and device support. Based on network application requirements of the application layer 11, the service layer 12 may determine required network capability requirements, which refer to network capabilities that meet the corresponding network service requirements, and may include, but are not limited to, large bandwidth, wide connectivity, low latency, certainty, high security, and the like. According to the network capability requirements of the service layer 12, corresponding network modes matching the mode layer 13 may also be called network technology modes, which refer to a sum of technical regulations to ensure normal operation of a communication network, and may include customized software and hardware configuration, a message format, a routing protocol, a switching manner, forwarding logic, operation and maintenance specifications, security policies, and the like. For example, a large-bandwidth network capability may be realized by matching network technology modes such as IPv4 and IPv6, certainty and low-latency network capabilities may be realized by matching industrial control identification network technology modes, and so on. The environment layer 14 may construct a support environment for a polymorphic network by network infrastructure to uniformly load heterogeneous network modes, which may include a controller, polymorphic network nodes (such as node computers, coprocessors, and terminal network cards), an application terminal, and the like.

The polymorphic network system 100 in the present embodiment, may provide, by the application layer, various network applications and scenarios in which the user are located when the network applications are used, so as to meet different network service requirements; determine, by the service layer, network capabilities required for different network applications, including a network bandwidth, a link manner, network delay, security, reliability, and the like; provide, by the mode layer, network modes that can meet the network capabilities, the network modes are network technology modes, which refer to the sum of technical regulations that ensure normal operation of the communication network; and provide, by the environment layer, the network infrastructure that is capable of supporting operation of various network modes, the network infrastructure is configured to generate, encapsulate, decapsulate, and route and forward, according to the network modes corresponding to the network applications, messages corresponding to the network applications. In this way, the corresponding network modes are matched based on the network service requirements, which achieves best adaptation of service applications to technical systems, thereby significantly reducing network resource overhead and solving a problem in a network development pattern in the related art that network technology modes are single and cannot meet different network service requirements.

Figure 2:
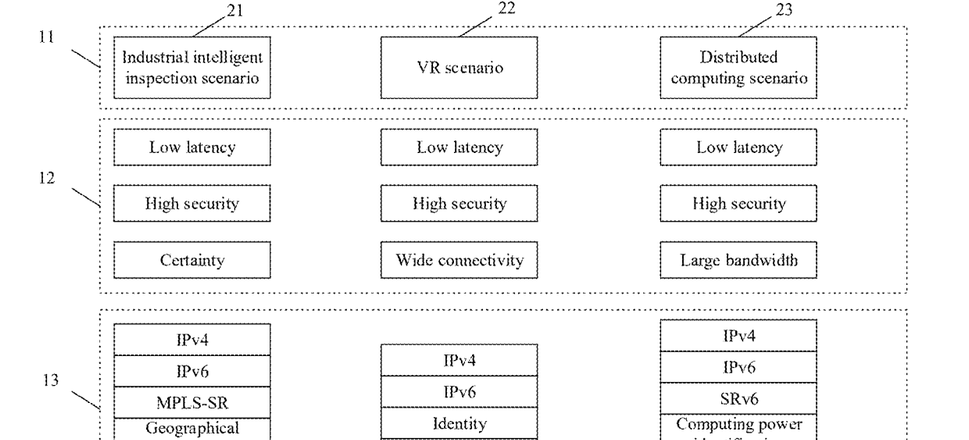
FIG. 2 is a schematic diagram of application scenarios matching network modes in some embodiments of the present disclosure.

In some embodiments, FIG. 2 is a schematic diagram of application scenarios matching network modes in some embodiments of the present disclosure. Referring to FIG. 2, in a case that the application layer 11 is an industrial intelligent inspection scenario 21, corresponding network capability requirements of the service layer 12 may be low latency, high security, and certainty, and according to the network capability requirements, corresponding network modes such as IPv4 (Internet Protocol version 4), IPv6 (Internet Protocol version 6), Segment Routing Multiprotocol Label Switching (MPLS-SR), geographical identification, and industrial control identification may be matched in the mode layer 13. In a case that the application layer 11 is a VR scenario 22, corresponding network capability requirements of the service layer 12 may be low latency, high security, and wide connectivity, and according to the network capability requirements, corresponding network modes such as IPv4, IPv6, identity, and computing power identification may be matched in the mode layer 13. In a case that the application layer 11 is a distributed computing scenario 23, corresponding network capability requirements of the service layer 12 may be low latency, high security, and large bandwidth, and according to the network capability requirements, corresponding network modes such as IPv4, IPv6, SRv6, computing power identification, and content identification may be matched in the mode layer 13. For the above three different network application scenarios, the corresponding network capability requirements may be determined respectively by the polymorphic network system 100, and the corresponding network modes may be matched according to the network capability requirements, which provides corresponding technical modes and network infrastructure for coexistence of a plurality of heterogeneous network modes in the system and meets diverse network application requirements.

In some embodiments, the environment layer may include a control layer and a data layer separated from each other, the data layer may include a plurality of types of network nodes, the data layer is configured to perform message transmission based on the network nodes, and the control layer is configured to perform unified scheduling and centralized control over network resources of the data layer.

In the present embodiment, the data layer may be separated from the control layer, and the data layer may include a plurality of network nodes. The network nodes may be classified into a variety of types according to a network topology. For example, the network nodes may be classified into terminal nodes, aggregation nodes, and backbone nodes according to positions of the network nodes in a network structure, or may be classified according to other characteristics. The data layer is mainly responsible for realizing message transmission of the network applications by various types of network nodes, including message generation, encapsulation, decapsulation, routing and forwarding, and the like. The control layer may provide unified scheduling and centralized control for the message transmission of the data layer based on device capabilities and network resources of the data layer.

Furthermore, the control layer may include a controller, and the controller is configured to implement at least one function of data layer function configuration and dynamic deployment, multi-modal addressing and routing, or unified network control and load balancing. Furthermore, the controller may also have, but is not limited to, functions such as topology discovery, route computing, flow table delivery, and link status awareness under control of a traditional Software Defined Network (SDN).

The polymorphic network system 100 in the present embodiment may implement, by the network nodes in the data layer, message transmission of the network applications, and perform, by the control layer, unified scheduling and planning of resources to provide required centralized control capability support for polymorphic network nodes, so as to support flexible and definable network capabilities such as symbiosis and coexistence of a plurality of network identification systems, diversified addressing, differentiated service operation, and the like, and achieve flexible network management and control.

Figure 3:
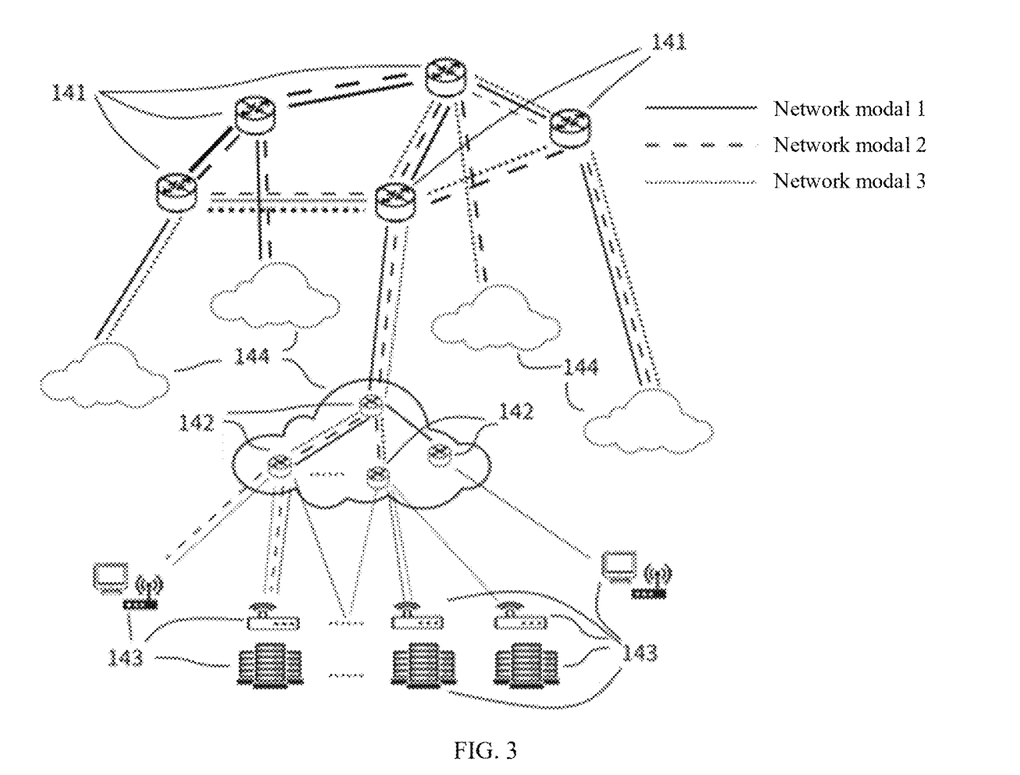
FIG. 3 is a schematic diagram of distribution and operation logic of network nodes in some embodiments of the present disclosure.

In some embodiments, FIG. 3 is a schematic diagram of distribution of network nodes in some embodiments of the present disclosure. Referring to FIG. 3, the network nodes may include terminal nodes 143, aggregation nodes 142, and backbone nodes 141. Each of the backbone nodes 141 may correspond to a polymorphic network domain 144 and a plurality of aggregation nodes 142 in the polymorphic network domain 144. Each of the aggregation nodes 142 may correspond to a plurality of terminal nodes 143.

The terminal nodes 143 are configured to generate corresponding messages based on the network applications and perform message transmission with the corresponding aggregation nodes 142. The aggregation nodes 142 are configured to route and forward the received messages, and transmit cross-network domain messages in the messages with the corresponding backbone nodes 141. The backbone nodes 141 are configured to perform isolated forwarding on the cross-network domain messages.

Specifically, the terminal nodes 143 may be network cards of terminal devices. For different network application requirements of the terminal devices, payload data required to send by network applications may be matched to corresponding network modes by active selection of the network applications or passive matching based on service quality, and corresponding messages may be generated according to the corresponding network modes. For example, the network applications may require message addressing and routing, and forwarding based on geographical positions. The terminal nodes may generate corresponding messages according to geographical identification addressing network modes based on payload data sent by an upper-layer application and send the messages to the aggregation nodes. In addition, for complex network applications, some general operations compatible with hardware acceleration (such as encryption and decryption) may be sunk to the terminal nodes to accelerate and offload the upper-layer application.

The aggregation nodes 142 may be coprocessors located in an access aggregation network to realize unified loading of multi-modal data. Polymorphic network messages generated by the terminal nodes 143 may be forwarded to the aggregation nodes 142. The aggregation nodes 142 may identify the corresponding network modes by parsing and matching the messages, and perform routing and forwarding according to addressing and routing manners of the network modes. When the messages are not required to transmit across network domains, for example, for the messages corresponding to the above geographical identification addressing network modes, when a target geographical position represented in a geographical identification data header is within the present polymorphic network domain, transmission across network domains is not required. In this case, the messages may only be required to forward to a destination terminal within the present polymorphic network domain according to addressing and routing manners of a geographical identification technology mode.

When the messages are required to transmit across network domains, for example, for the messages corresponding to the above geographical identification addressing network modes, when the target geographical position represented in the geographical identification data header is outside the present polymorphic network domain, transmission across network domains is required. The aggregation nodes 142 may send the messages to the corresponding backbone nodes 141. The backbone nodes 141 may be node computers in a backbone network. The backbone nodes 141 may divide resource-isolated hard-isolated high-speed forwarding pipelines for different communication routes in different network modes and in the same network mode, to realize high-speed interconnection and forwarding of data services between polymorphic network domains (i.e., access aggregation networks). According to network domain addresses of destination routes included in the cross-network domain messages, the cross-network domain messages may be isolated and forwarded to the corresponding backbone nodes 141, and then are sent to the aggregation node 142 within the corresponding network domains by the backbone nodes.

The polymorphic network system 100 in the present embodiment, may generate, by the terminal nodes, messages corresponding to the network applications and access a network, route and forward, by the aggregation nodes 142, the messages according to addressing and routing manners of the network modes corresponding to the messages, and realize, by the backbone nodes 141, high-speed isolated transmission of data between network domains. By collaborative operation of the terminal nodes 143, the aggregation nodes 142, and the backbone nodes 141, a logic of hierarchical collaboration of nodes adapting to functions and performance of heterogeneous network modes may be established to meet end-to-end high-speed processing requirements of a plurality of network mode services.

In some embodiments, the terminal nodes 143 are further configured to determine corresponding network modes based on the network capability requirements corresponding to the network applications, and encapsulate, based on the network modes, data of the network applications into network domain messages and send the network domain messages to the aggregation nodes 142, and receive and decapsulate the network domain messages sent by the aggregation nodes 142.

For different application requirements of the terminal devices, after payload data required to send by network applications are matched to corresponding network modes by active selection of the network applications or passive matching based on service quality, message encapsulation and decapsulation operations may be performed according to the corresponding network modes. For example, the network applications require addressing and routing, and forwarding of data packets based on geographical positions. The terminal nodes 143 may encapsulate the payload data sent by the upper-layer application into the messages according to the geographical identification addressing network mode and send encapsulated messages to the aggregation nodes 142. The decapsulation process is opposite. The encapsulated messages may be network domain messages and may be forwarded between the aggregation nodes 142 in the network domain.

The polymorphic network system 100 in the present embodiment, may encapsulate, by the terminal nodes 143, data of the network applications into network domain messages according to the network modes, complete intelligent matching of service data with the network modes, establish a network identification addressing manner that meets service function and performance requirements, encapsulate or decapsulate corresponding network mode data packets, and provide destination addresses for the corresponding aggregation nodes 142 to perform routing and forwarding according to the network identification addressing manner, which meets data transmission requirements of different network applications and improves data transmission efficiency.

In some embodiments, the aggregation nodes 142 are further configured to determine the corresponding network modes based on the received network domain messages, and perform routing and forwarding based on addressing and routing manners of the network modes.

The aggregation nodes 142 may identify the network modes corresponding to the network domain messages by parsing and matching the network domain messages, and perform routing and forwarding according to addressing and routing manners of the network modes. The same aggregation node 142 may realize unified loading and collaborative aggregation of a plurality of network modes. That is, the aggregation nodes 142 may simultaneously load data in heterogeneous network modes and have corresponding data processing capabilities. Furthermore, the aggregation nodes 142 may be responsible for multi-modal unified loading, fast aggregation, and in-band general computing within the network domain.

The polymorphic network system 100 in the present embodiment, may identify, by the aggregation nodes 142, the network modes corresponding to the network domain messages, and perform routing and forwarding based on the addressing and routing manners of the network modes, to realize addressing and routing under a corresponding network mode technology system, i.e., collaborative processing and unified loading of routing and addressing manners of a plurality of network technologies in the polymorphic network domain. Message transmission may be matched with the corresponding network modes, which meets data transmission requirements of different network applications and improves data transmission efficiency.

Figure 4:
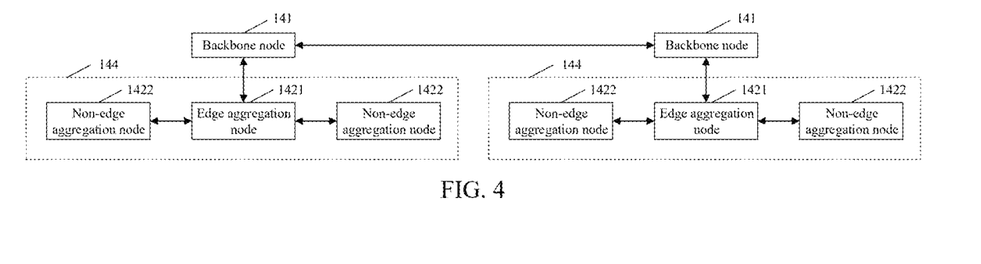
FIG. 4 is a schematic diagram of connections between backbone nodes and a polymorphic network domain in some embodiments of the present disclosure.

In some embodiments, FIG. 4 is a schematic diagram of connections between backbone nodes and a polymorphic network domain in some embodiments of the present disclosure. Referring to FIG. 4, the polymorphic network domain 144 may include non-edge aggregation nodes 1422 and edge aggregation nodes 1421 connected to the corresponding backbone nodes 141. The non-edge aggregation nodes 1422 are further configured to determine whether destination routes of the network domain messages are within the polymorphic network domain 144 where the aggregation nodes 142 are located, and forward the network domain messages to the edge aggregation nodes 1421 when the destination routes are not within the polymorphic network domain 144. The edge aggregation nodes 1421 are further configured to encapsulate the network domain messages into the cross-network domain messages, and send the cross-network domain messages to the backbone nodes 141. The cross-network domain messages may include network domain addresses where the destination routes are located.

The aggregation nodes 142 may determine, according to destination addresses of the network domain messages, whether the destination routes of the network domain messages are within the polymorphic network domain 144 where the aggregation nodes 142 are located. When the destination routes are within the polymorphic network domain 144 where the aggregation nodes 142 are located, transmission across network domains is not required. In this case, the network domain messages may only be required to forward to a destination terminal within this polymorphic network domain according to addressing and routing manners corresponding to the network modes of the network domain messages. When the destination routes are not within the polymorphic network domain 144 where the aggregation nodes 142 are located, transmission across network domains is required. In this case, the non-edge aggregation nodes 1422 connected to the terminal nodes which send the network domain messages may rapidly forward the network domain messages to the edge aggregation nodes 1421 connected to the backbone network. The edge aggregation nodes 1421 may encapsulate the network domain messages according to the corresponding network modes into cross-network domain messages suitable for high-speed forwarding over the backbone network, and write, according to a rapid aggregation capability of corresponding network modal data, domain address information of a destination network domain in specified fields of the encapsulated cross-network domain messages.

Taking the geographical identification addressing network mode in the above embodiments as an example, when the messages are required to transmit across network domains, i.e., the target geographical position represented in the geographical identification data header is outside this polymorphic network domain, the messages in the network domain may be required to rapidly forward to the edge aggregation nodes 1421 connected to the backbone nodes 141, and a routing information field representing a destination polymorphic network domain (which is a geographical position information field of the destination network domain here) may be extracted at the edge aggregation nodes 1421. Then, the edge aggregation nodes 1421 may encapsulate the routing information field into specified fields of message headers such as SRv6 and MPLS-SR (mainstream high-speed forwarding network modes suitable for loading by the backbone network), which may be finally handed over to the backbone nodes 141 for forwarding.

The polymorphic network system 100 in the present embodiment, may determine, by the aggregation nodes 142, whether the destination routes of the network domain messages are within the polymorphic network domain where the aggregation nodes 142 are located, so as to clarify forwarding paths of the network domain messages to obtain forwarding resources within the polymorphic network domain of the corresponding backbone network or aggregation network, and encapsulate, by the edge aggregation nodes 1421, the network domain messages into the cross-network domain messages and send the cross-network domain messages to the corresponding backbone nodes 141, which realizes transmission of polymorphic network services across the backbone network and high-speed interconnection and forwarding of data and improves forwarding efficiency of network messages.

In some embodiments, the backbone nodes 141 are further configured to identify the corresponding network modes based on the received cross-network domain messages, acquire network domain addresses of the cross-network domain messages based on the network modes, and assign, based on network capability requirements and the network modes corresponding to the cross-network domain messages, corresponding resources to the cross-network domain messages and perform isolated forwarding.

The backbone nodes 141 may divide resource-isolated hard-isolated high-speed forwarding pipelines for different communication routes in different network modes and in the same network mode, to realize high-speed interconnection and forwarding of data services between polymorphic network domains (i.e., access aggregation networks). The backbone nodes 141 may also flexibly adjust a forwarding mechanism and resource assignment of the backbone network according to changes in the network mode service requirements. For example, for messages in the same network mode, different hard-isolated high-speed channels may be divided according to differentiated requirements of network service quality to perform forwarding, and a bandwidth of the backbone network may be flexibly adjusted according to changes in bandwidth and delay requirements of different network mode services, and so on. For example, for the geographical identification addressing messages required to transmit across network domains, the backbone nodes may first identify that types of the network modes of the cross-network domain messages are network modes based on geographical identification addressing, extract domain address information of a destination network domain (which refers to geographical position information of the destination network domain here) from specified fields of the cross-network domain messages, calculate forwarding paths and corresponding resource information of the backbone network according to network capability requirements or service quality requirements of the network applications, assign corresponding resources to the cross-network domain messages, and perform isolated forwarding. When resources of the backbone network, borne network modes, network services, and the like change, the backbone nodes 141 may also adjust forwarding resources in time to adapt to network capability requirements of service changes.

The polymorphic network system 100 in the present embodiment, may identify, by the backbone nodes 141, the network modes corresponding to the cross-network domain messages, assign, according to the network modes and the network capability requirements, corresponding resources to the cross-network domain messages and perform isolated forwarding, and flexibly adjust the forwarding mechanism and resource assignment of the backbone network according to changes in service requirements, which improves forwarding efficiency and flexibility of the backbone network.

In some embodiments, the backbone nodes 141 are further configured to determine forwarding paths and hard isolation pipeline parameters based on the network capability requirements corresponding to the cross-network domain messages, construct, based on the forwarding paths and the hard isolation pipeline parameters, hard isolation pipelines corresponding to the network modes, and perform isolated forwarding on the cross-network domain messages based on the hard isolation pipelines.

The backbone nodes 141 may calculate, based on network capability requirements or service quality requirements of the cross-network domain messages, forwarding paths and hard isolation pipeline information of the backbone network, such as hard isolation bandwidth, hard isolation pipeline residence time, and hard isolation pipeline delay to be obtained by division for all services in the network modes or different network services in the same network mode, then construct, according to the forwarding paths and the hard isolation pipeline information, network-mode-oriented isolation pipelines by applying a network isolation technology such as a Flexible Ethernet (FlexE)/Metro Transport Network (MTN), and finally perform high-speed isolated forwarding over the backbone network based on SRv6, MPLS-SR, and the like. The backbone nodes 141 may flexibly adjust the forwarding mechanism and resource assignment of the backbone network according to changes in the network mode service requirements. For example, for data packets in the same network mode, different hard-isolated high-speed channels may be divided according to differentiated requirements of network service quality to perform forwarding, a bandwidth of the backbone network may be flexibly adjusted according to changes in bandwidth and delay requirements of different network mode services, and so on.

The polymorphic network system 100 in the present embodiment, may determine, by the backbone nodes 141, forwarding paths and hard isolation pipeline parameters based on the network capability requirements, construct hard isolation pipelines corresponding to the network modes, which realizes high-speed isolated transmission of data in different network modes and different communication routes in the same network mode, increases a speed of data transmission and improves security and stability of data transmission, and assign, by the backbone nodes 141, network resources of the backbone network according to the network capability requirements and flexibly adjust the network resources of the backbone network according to changes in bandwidth and delay requirements of different network mode services, which improves transmission efficiency and flexibility of the backbone network.

Figure 5:
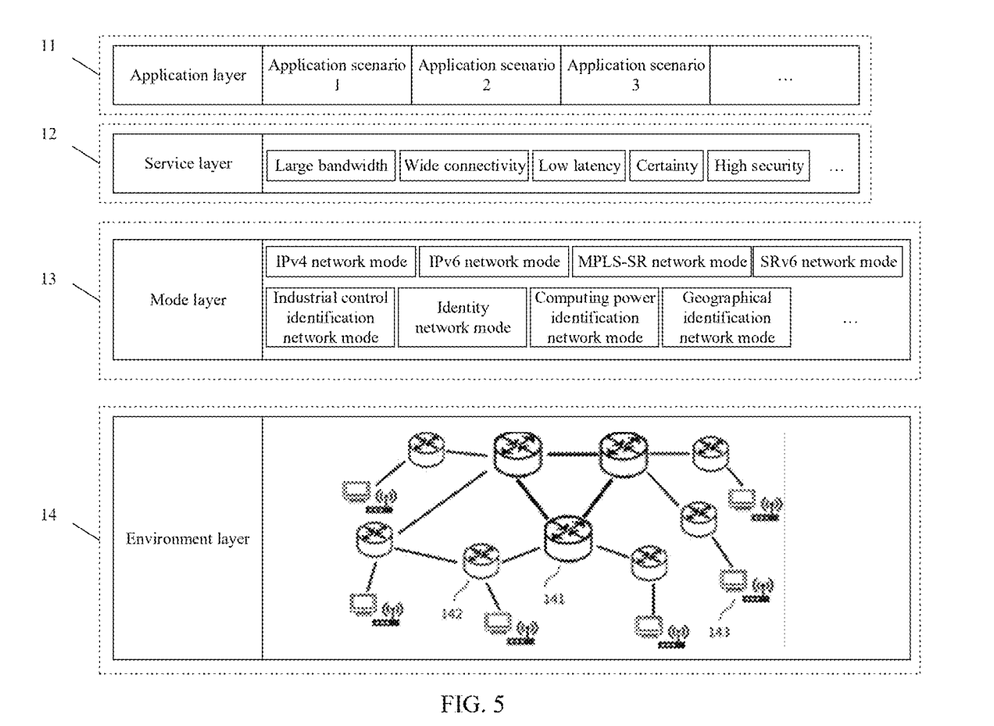
FIG. 5 is a schematic diagram of a polymorphic network system in some embodiments of the present disclosure.

This embodiment may be described below by alternative embodiments. FIG. 5 is a schematic diagram of the polymorphic network system 100 in some alternative embodiments of the present disclosure. Referring to FIG. 5, from top to bottom, the polymorphic network system 100 sequentially includes an application layer 11, a service layer 12, a mode layer 13, and an environment layer 14. The environment layer 14 includes a control layer and a data layer separated from each other. The data layer includes a plurality of network nodes. The network nodes include terminal network cards, coprocessors, and node computers.

The polymorphic network system 100 in the present embodiment may form a hierarchical network architecture according to a top-down design idea. Based on requirements, the application layer 11 may abstract, for diverse applications, network capability requirements required for the service layer 12, such as large bandwidth, wide connectivity, low latency, certainty, and high security. Network technology modes corresponding to the mode layer 13 may be matched according to the network capability requirements of the service layer 12. For example, the large-bandwidth network capability may be realized by matching network technology modes such as IPv4 and IPv6, the certainty and low-latency network capabilities may be realized by matching industrial control identification network technology modes, and so on. The environment layer 14 may construct a polymorphic network intelligent support environment by polymorphic network nodes to uniformly load heterogeneous network technology modes, mainly including a controller, polymorphic network nodes (such as node computers, coprocessors, and terminal network cards), and an application terminal.

For example, for an industrial intelligent inspection application scenario, firstly, main network capability requirements required for the application scenario may be abstracted as low latency, high security, certainty, and the like. Then, network technology modes with corresponding capabilities may be matched according to network capability requirements, which specifically include industrial control identification, IPv4, IPv6, geographical identification, and the like, and personalized network capability support may be provided for the industrial intelligent inspection scenario by an organic combination of the above multiple network modes. Finally, the above network modes may be uniformly run in a polymorphic network intelligent support environment including node computers, coprocessors, and terminal network cards.

Specifically, on a terminal side, the terminal network cards may implement network mode matching and data packet generation/decapsulation for application services. For different application requirements of the terminal devices, payload data required to send by applications may be matched to corresponding network modes by active selection of the applications or passive matching based on service quality, and message encapsulation and decapsulation operations may be performed according to the corresponding network modes. For example, the applications may require addressing and routing, and forwarding of data packets based on geographical positions. The terminal network cards may encapsulate the payload data sent by the upper-layer application into the messages according to the geographical identification addressing network mode and send the encapsulated messages to the coprocessors. The decapsulation process is opposite. In addition, for complex network applications, some general operations compatible with hardware acceleration (such as encryption and decryption) may be sunk to the terminal network cards to accelerate and offload the upper-layer application.

In the access aggregation network, the coprocessors may realize unified loading of multi-modal data. Polymorphic network data packets generated by the terminal network cards may be forwarded to the coprocessors. The coprocessors may identify network modes corresponding to the data packets by parsing and matching the data packets, and perform routing and forwarding according to addressing and routing manners of the network modes. When the data is required to transmit across the backbone network, the coprocessors connected to the terminal network cards may quickly forward the data packets to edge coprocessor nodes connected to the backbone network, encapsulate, at the edge nodes, the corresponding network mode data packets into network mode data packets suitable for high-speed forwarding over the backbone network, and write, according to a rapid aggregation capability of the corresponding network modal data, domain address information of a destination network domain in specified fields of the "encapsulated" messages, to realize transmission of the polymorphic network services across the backbone network. For example, when the above geographical identification network modal data packets are not required to transmit across the backbone network, such data packets may only be required to forward to destination terminals within this polymorphic network domain according to addressing and routing manners of geographical identification technology modes. When the data packets are required to transmit across the backbone network, that is, the target geographical position represented in the geographical identification data header is outside this polymorphic network domain, the data packets may be required to rapidly forward to the edge coprocessor nodes connected to the backbone network, and a routing information field representing a destination polymorphic network domain (which is a geographical position information field of the destination network domain here) may be extracted at the edge coprocessor nodes. Then, the edge coprocessor nodes may encapsulate the field into specified fields of data packet headers such as SRv6 and MPLS-SR (mainstream high-speed forwarding network modes suitable for loading by the backbone network), which is finally handed over to the node computers for backbone interconnection and forwarding.

In the backbone network, the node computers may realize isolation and high-speed forwarding based on network modes. For service data required to transmit across polymorphic network domains by the backbone network, the node computers may divide resource-isolated hard-isolated high-speed forwarding pipelines, which realize high-speed interconnection and forwarding of data services between the polymorphic network domains (i.e., access aggregation networks). The backbone network may flexibly adjust a forwarding mechanism and resource assignment of the backbone network according to changes in the network mode service requirements. For example, for data packets in the same network mode, different hard-isolated high-speed channels may be obtained by division according to differentiated requirements of network service quality to perform forwarding, a bandwidth of the backbone network may be flexibly adjusted according to changes in bandwidth and delay requirements of different network mode services, and so on. For example, for the above geographical identification addressing data required to transmit across the backbone network, the node computers may first identify that mode types of the data packets are network modes based on geographical identification addressing, extract "domain address information" of a destination network domain (which refers to geographical position information of the destination network domain here) from specified fields of the data packets, calculate forwarding paths and hard isolation pipeline information (such as hard isolation bandwidth, hard isolation pipeline residence time, and hard isolation pipeline delay to be obtained by division for all services in the network modes or different network services in the same network mode) of the backbone network according to service quality requirements of the data service, then construct, according to the above information and a network isolation technology (such as FlexE/MTN), network-mode-oriented isolation pipelines, and finally perform high-speed isolated forwarding over the backbone network based on SRv6, MPLS-SR, and the like. When resources of the backbone network, borne network modes, network services, and the like change, the node computers may adjust states such as hard isolation pipeline paths and bandwidth in time to adapt to network capability requirements of service changes.

In addition to negotiation about a butting logical interface in advance, a collaborative operation processing logic among the above terminal network cards, coprocessors, and node computers may also require unified scheduling and planning of resources by an upper-layer controller. The upper-layer controller may have, but is not limited to, functions such as topology discovery, route computing, flow table delivery, and link status awareness under control of a traditional SDN.

The polymorphic network system 100 in the present embodiment, may support, by a four-layer architecture of the application layer, the service layer, the mode layer, and the environment layer, personalized network requirements of diverse service scenarios from top to bottom and finally perform unified loading on the same network infrastructure, realize terminal-side multi-modal intelligent loading adaptation and computing offload acceleration by the terminal network cards, realize unified loading of multi-modal technology modes and efficient traffic aggregation of an access aggregation layer by the coprocessors, realize network-mode-oriented hard channel isolation and high-speed forwarding over the backbone network by the node computers, and provide required centralized control capability support for the polymorphic network nodes by the controller, which solves the problem in the network development pattern in the related art that network technology modes are single and cannot meet different network service requirements and achieves best adaptation of service applications to technical systems, thereby significantly reducing network resource overhead, improving service quality, and improving efficiency, flexibility, and stability of data transmission.

Figure 6:
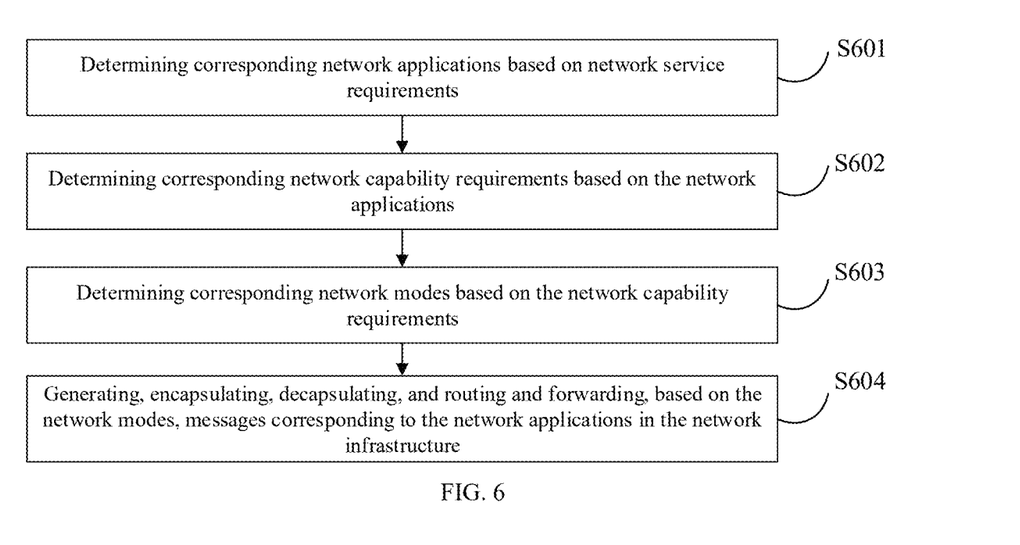
FIG. 6 is a flowchart of a polymorphic network operation method in some embodiments of the present disclosure.

In some embodiments, the present disclosure further provides a polymorphic network operation method. The polymorphic network operation method is applied to the polymorphic network system 100 in the above embodiments. Corresponding to the above polymorphic network system 100, content not disclosed in the polymorphic network operation method in the present embodiment may be obtained with reference to corresponding content of the above polymorphic network system 100. Details are not described herein in the present disclosure. The polymorphic network system 100 includes network infrastructure configured to load and transmit messages corresponding to various network applications. FIG. 6 is a flowchart of a polymorphic network operation method in some embodiments of the present disclosure. Referring to FIG. 6, the process includes the following step 601 to step 604.

Step 601 includes determining corresponding network applications based on network service requirements.

The network service requirements may refer to network services oriented to future Internet, for example, consumer services such as AR/VR, online games, and webcasts, and manufacturing services such as industrial manufacturing, unmanned driving, and telemedicine. The network applications may refer to various network applications and environments and scenarios in which the user is most likely to be when the network applications are used, including aspects such as time, space, and device support. In order to meet people's various network service requirements in production and life, the corresponding network applications may be determined according to application environments and application scenarios where the network service requirements are located, including functions, service logic, implementation effects, and the like of the network applications.

Step 602 includes determining corresponding network capability requirements based on the network applications.

Network capabilities required (that is, network capabilities that meet the corresponding network service requirements, such as large bandwidth, wide connectivity, low latency, certainty, and high security) may be determined according to the functions, the service logic, the implementation effects, and the like of the network applications. The network capability requirements may be qualitative or quantitative.

Step 603 includes determining corresponding network modes based on the network capability requirements.

The network modes may also be called network technology modes, which refers to a sum of technical regulations to ensure normal operation of a communication network, and may include customized software and hardware configuration, a message format, a routing protocol, a switching manner, forwarding logic, operation and maintenance specifications, security policies, and the like. For example, the large-bandwidth network capability may be realized by matching network technology modes such as IPv4 and IPv6, the certainty and low-latency network capabilities may be realized by matching industrial control identification network technology modes, and so on.

Step 604 includes generating, encapsulating, decapsulating, and routing and forwarding, based on the network modes, messages corresponding to the network applications in the network infrastructure.

The network infrastructure may refer to a support environment for a polymorphic network, which may include a controller, polymorphic network nodes (such as node computers, coprocessors, and terminal network cards), an application terminal, and the like. The network infrastructure is configured to generate, encapsulate, decapsulate, and route and forward, according to the network modes corresponding to the network applications, the messages corresponding to the network applications, to realize data transmission for network applications based on different network modes.

At step 601 to step 604 above, corresponding network applications may be determined based on network service requirements, so as to determine functions, service logic, implementation effects, and the like of the network applications based on application scenarios of the network service requirements, corresponding network capability requirements may be determined based on the network applications, so as to clearly define network resource conditions required to implement the network applications, corresponding network modes may be determined based on the network capability requirements, so as to match network modes with corresponding capabilities based on the network capability requirements and provide technical modes corresponding to the network modes to ensure that multiple network modes can coexist in the same physical facility and play respective roles, and messages corresponding to the network applications are capable of being generated, encapsulated, decapsulated, and routed and forwarded in the network infrastructure based on the network modes, so as to provide multi-modal symbiosis and coexistence network capability support for polymorphic network environments, which solves the problem in the network development pattern in the related art that network technology modes are single and cannot meet different network service requirements and achieves best adaptation of service applications to technical systems, thereby significantly reducing network resource overhead and improving service quality.

In some embodiments, the generating, encapsulating, decapsulating, and routing and forwarding, based on the network modes, the messages corresponding to the network applications in the network infrastructure may include: performing message transmission based on a plurality of types of network nodes; and performing unified scheduling and centralized control over network resources of the data layer.

In some embodiments, the network nodes may include terminal nodes, aggregation nodes, and backbone nodes, each of the backbone nodes may be corresponding to a polymorphic network domain and a plurality of aggregation nodes in the polymorphic network domain, and each of the aggregation nodes may be corresponding to a plurality of terminal nodes. The method may further include: generating, by the terminal nodes, corresponding messages based on the network applications and performing message transmission with the corresponding aggregation nodes; routing and forwarding, by the aggregation nodes, the received messages, and transmitting cross-network domain messages in the messages with the corresponding backbone nodes; and performing, by the backbone nodes, isolated forwarding on the cross-network domain messages.

In some embodiments, the method further may include: determining, by the terminal nodes, corresponding network modes based on the network capability requirements corresponding to the network applications, encapsulating, based on the network modes, data of the network applications into network domain messages and sending the network domain messages to the aggregation nodes, and receiving and decapsulating the network domain messages sent by the aggregation nodes.

In some embodiments, the method may further include: determining, by the aggregation nodes, the corresponding network modes based on the received network domain messages; and performing routing and forwarding based on addressing and routing manners of the network modes.

In some embodiments, the polymorphic network domain may include non-edge aggregation nodes and edge aggregation nodes connected to the corresponding backbone nodes. The method further includes: determining, by the non-edge aggregation nodes, whether destination routes of the network domain messages are within the polymorphic network domain where the aggregation nodes are located; forwarding the network domain messages to the edge aggregation nodes when the destination routes are not within the polymorphic network domain; encapsulating, by the edge aggregation nodes, the network domain messages into cross-network domain messages, the cross-network domain messages including network domain addresses where the destination routes are located; and sending the cross-network domain messages to the backbone nodes.

In some embodiments, the method may further include: identifying, by the backbone nodes, the corresponding network modes based on the received cross-network domain messages; acquiring network domain addresses of the cross-network domain messages based on the network modes; and assigning, based on network capability requirements and the network modes corresponding to the cross-network domain messages, corresponding resources to the cross-network domain messages and performing isolated forwarding.

In some embodiments, the method may further include: determining, by the backbone nodes, forwarding paths and hard isolation pipeline parameters based on the network capability requirements corresponding to the cross-network domain messages; constructing, based on the forwarding paths and the hard isolation pipeline parameters, hard isolation pipelines corresponding to the network modes; and performing isolated forwarding on the cross-network domain messages based on the hard isolation pipelines.

In some embodiments, the performing unified scheduling and centralized control over the network resources of the data layer may specifically include at least one function of data layer function configuration and dynamic deployment, multi-modal addressing and routing, or unified network control and load balancing.

It should be noted that, steps shown in the above processes or the flowcharts of the accompanying drawings may be performed in a computer system including a group of computer executable instructions. Moreover, although a logical sequence is shown in the flowcharts, in some cases, the shown or described steps may be performed in a sequence different from the sequence herein.

It is to be noted that specific examples in the present embodiment may be obtained with reference to the examples described in the above embodiments and alternative implementations. Details are not described again in the present embodiment.

It should be understood that specific embodiments described herein are only intended to explain the present disclosure and are not intended to limit the present disclosure. According to the embodiments provided in the present disclosure, all other embodiments obtained by those of ordinary skill in the art without creative efforts fall within the protection scope of the present disclosure.

Obviously, the accompanying drawings are only some examples or embodiments of the present disclosure. For those skilled in the art, the present disclosure can also be applied to other similar situations based on these accompanying drawings without creative efforts. In addition, it may be understood that, although the work done in this development process may be complex and lengthy, for those skilled in the art, certain designs, manufacturing, production, or other changes based on the technical content disclosed in the present disclosure are only routine technical means and should not be regarded as insufficient content disclosed in the present disclosure.

The word "embodiment" in the present disclosure means that specific features, structures, or characteristics described in conjunction with the embodiments may be included in at least one embodiment of the present disclosure. Phrases appearing at various positions of the specification neither mean the same embodiment, nor mean separate or alternative embodiments that are mutually exclusive with other embodiments. It is explicitly or implicitly understood by those skilled in the art that the embodiments described in the present disclosure may be combined with other embodiments without conflict.

The above embodiments only describe several implementations of the present disclosure, which are described specifically and in detail, and therefore cannot be construed as a limitation on the protection scope of the patent. It should be pointed out that those of ordinary skill in the art may also make several changes and improvements without departing from the ideas of the present disclosure, all of which fall within the protection scope of the present disclosure. Therefore, the protection scope of the present disclosure shall be subject to the appended claims.

What is claimed is:

1. A polymorphic network system, sequentially comprising an application layer, a service layer, a mode layer, and an environment layer; wherein
   the application layer is configured to provide network applications corresponding to network service requirements;
   the service layer is configured to determine network capability requirements for implementing the network applications;
   the mode layer is configured to provide corresponding network modes based on the network capability requirements; and
   the environment layer is configured to provide network infrastructure that is capable of supporting operation of the network modes, the network infrastructure is configured to load and transmit messages corresponding to the network applications, the messages are capable of being generated, encapsulated, decapsulated, and routed and forwarded based on the network modes corresponding to the network applications;
   the environment layer comprises a control layer and a data layer separated from each other, and the data layer comprises a plurality of types of network nodes,
   the data layer is configured to perform message transmission based on the network nodes; and
   the control layer is configured to perform unified scheduling and centralized control over network resources of the data layer;
   the network nodes comprise terminal nodes, aggregation nodes, and backbone nodes, each of the backbone nodes is corresponding to a polymorphic network domain and a plurality of aggregation nodes in the polymorphic network domain, and each of the aggregation nodes is corresponding to a plurality of terminal nodes;
   the terminal nodes are configured to generate corresponding messages based on the network applications and perform message transmission with the corresponding aggregation nodes;
   the aggregation nodes are configured to route and forward received messages, and transmit cross-network domain messages in the messages with corresponding backbone nodes; and
   the backbone nodes are configured to perform isolated forwarding on the cross-network domain messages;
   the aggregation nodes are further configured to determine the corresponding network modes based on received network domain messages, and perform routing and forwarding based on addressing and routing manners of the network modes;
   the polymorphic network domain comprises non-edge aggregation nodes and edge aggregation nodes connected to the corresponding backbone nodes;

the non-edge aggregation nodes are further configured to determine whether destination routes of the network domain messages are within the polymorphic network domain where the aggregation nodes are located, and forward the network domain messages to the edge aggregation nodes when the destination routes are not within the polymorphic network domain; and the edge aggregation nodes are further configured to encapsulate the network domain messages into the cross-network domain messages, and send the cross-network domain messages to the backbone nodes, wherein the cross-network domain messages comprise network domain addresses where the destination routes are located.

2. The polymorphic network system of claim 1, wherein the terminal nodes are further configured to determine corresponding network modes based on the network capability requirements corresponding to the network applications, and encapsulate, based on the network modes, data of the network applications into network domain messages, send the network domain messages to the aggregation nodes, and receive and decapsulate the network domain messages sent by the aggregation nodes.

3. The polymorphic network system of claim 1, wherein the backbone nodes are further configured to identify the corresponding network modes based on received cross-network domain messages, acquire network domain addresses of the cross-network domain messages based on the network modes, and assign, based on network capability requirements and the network modes corresponding to the cross-network domain messages, corresponding resources to the cross-network domain messages and perform isolated forwarding.

4. The polymorphic network system of claim 3, wherein the backbone nodes are further configured to determine forwarding paths and hard isolation pipeline parameters based on the network capability requirements corresponding to the cross-network domain messages, construct, based on the forwarding paths and the hard isolation pipeline parameters, hard isolation pipelines corresponding to the network modes, and perform isolated forwarding on the cross-network domain messages based on the hard isolation pipelines.

5. The polymorphic network system of claim 1, wherein the control layer comprises a controller, the controller is configured to implement at least one function of data layer function configuration and dynamic deployment, multimodal addressing and routing, or unified network control and load balancing.

6. A polymorphic network operation method, wherein the method is applied to a polymorphic network system, the polymorphic network system comprises network infrastructure configured to load and transmit messages corresponding to network applications, and the method comprises:

determining corresponding network applications based on network service requirements;

determining corresponding network capability requirements based on the network applications;

determining corresponding network modes based on the network capability requirements; and generating, encapsulating, decapsulating, and routing and forwarding, based on the network modes, messages corresponding to the network applications in the network infrastructure;

the generating, encapsulating, decapsulating, and routing and forwarding, based on the network modes, the messages corresponding to the network applications in the network infrastructure comprises:

performing message transmission based on a plurality of types of network nodes; and performing unified scheduling and centralized control over network resources;

the network nodes comprise terminal nodes, aggregation nodes, and backbone nodes, each of the backbone nodes is corresponding to a polymorphic network domain and a plurality of aggregation nodes in the polymorphic network domain, and each of the aggregation nodes is corresponding to a plurality of terminal nodes; the method further comprises:

generating, by the terminal nodes, corresponding messages based on the network applications and performing message transmission with the corresponding aggregation nodes;

routing and forwarding, by the aggregation nodes, the received messages, and transmitting cross-network domain messages in the messages with the corresponding backbone nodes; and performing, by the backbone nodes, isolated forwarding on the cross-network domain messages;

determining, by the aggregation nodes, the corresponding network modes based on the received network domain messages; and performing routing and forwarding based on addressing and routing manners of the network modes;

the polymorphic network domain comprises non-edge aggregation nodes and edge aggregation nodes connected to the corresponding backbone nodes; the method further comprises:

determining, by the non-edge aggregation nodes, whether destination routes of the network domain messages are within the polymorphic network domain where the aggregation nodes are located;

forwarding the network domain messages to the edge aggregation nodes when the destination routes are not within the polymorphic network domain;

encapsulating, by the edge aggregation nodes, the network domain messages into cross-network domain messages, wherein the cross-network domain messages comprise network domain addresses where the destination routes are located; and sending the cross-network domain messages to the backbone nodes.

7. The polymorphic network operation method of claim 6, wherein the method further comprises:

determining, by the terminal nodes, corresponding network modes based on the network capability requirements corresponding to the network applications;

encapsulating, based on the network modes, data of the network applications into network domain messages and sending the network domain messages to the aggregation nodes; and receiving and decapsulating the network domain messages sent by the aggregation nodes.

8. The polymorphic network operation method of claim 6, wherein the method further comprises:

identifying, by the backbone nodes, the corresponding network modes based on the received cross-network domain messages;

acquiring network domain addresses of the cross-network domain messages based on the network modes; and assigning, based on network capability requirements and the network modes corresponding to the cross-network domain messages, corresponding resources to the cross-network domain messages and performing isolated forwarding.

9. The polymorphic network operation method of claim 8, wherein the method further comprises:

determining, by the backbone nodes, forwarding paths and hard isolation pipeline parameters based on the network capability requirements corresponding to the cross-network domain messages;

constructing, based on the forwarding paths and the hard isolation pipeline parameters, hard isolation pipelines corresponding to the network modes; and performing isolated forwarding on the cross-network domain messages based on the hard isolation pipelines.

10. The polymorphic network operation method of claim 6, wherein the performing unified scheduling and centralized control over the network resources comprises at least one function of data layer function configuration and dynamic deployment, multi-modal addressing and routing, or unified network control and load balancing.

* * * * *